(No Model.)

J. BRUSS.
SPLIT PULLEY.

No. 384,014. Patented June 5, 1888.

Witnesses,
Geo. W. Young,
N. E. Oliphant

Inventor,
Julius Bruss.
By
A. Stout & Underwood
Attorneys.

UNITED STATES PATENT OFFICE.

JULIUS BRUSS, OF MILWAUKEE, WISCONSIN.

SPLIT PULLEY.

SPECIFICATION forming part of Letters Patent No. 384,014, dated June 5, 1888.

Application filed February 24, 1888. Serial No. 265,155. (No model.)

*To all whom it may concern:*

Be it known that I, JULIUS BRUSS, of Milwaukee, in the county of Milwaukee, and in the State of Wisconsin, have invented certain new and useful Improvements in Split Pulleys; and I do hereby declare that the following is a full, clear, and exact description thereof.

My invention relates to split pulleys, and will be fully described hereinafter.

Figure 1:
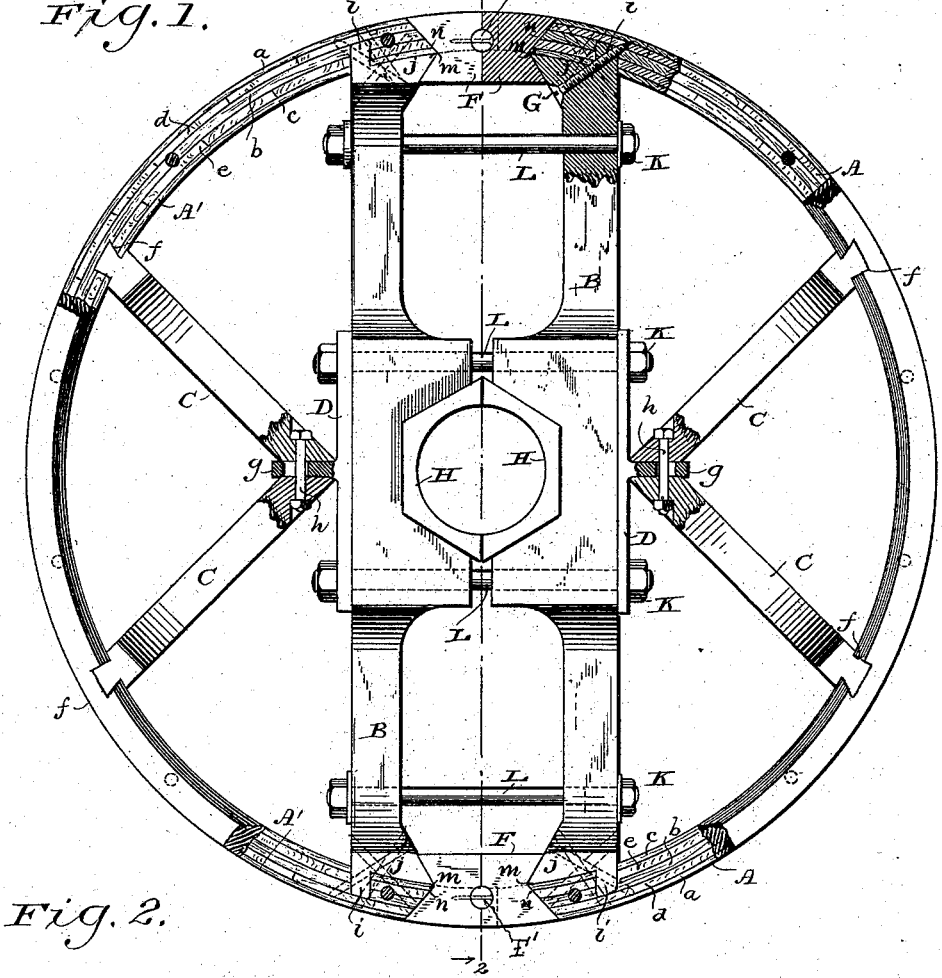
Figure 2:
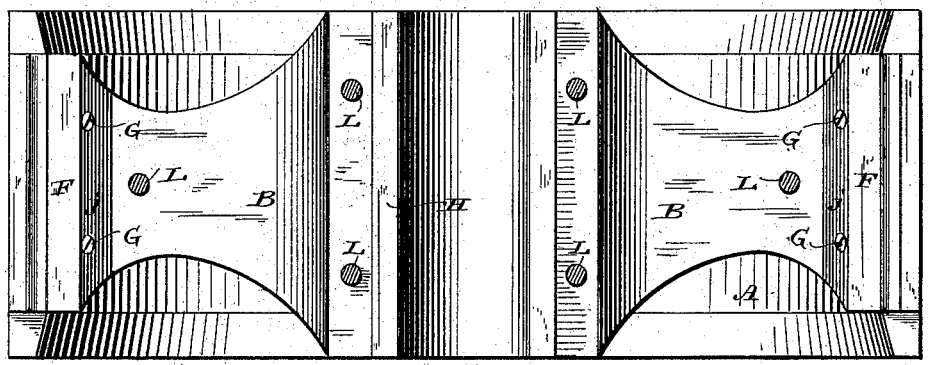

In the drawings, Figure 1 is an end elevation, partly broken away. Fig. 2 is a section on line 2 2, Fig. 1; and Fig. 3, a detail of a modification.

The rim A A' of my improved pulley consists of several layers of wood, of which layers *a b c* are cut with the grain of the wood and layers *d e* across the grain. The ends of each half-rim are trussed apart by a cross-bar, B, and these bars are braced centrally by arms C, the outer ends of which are dovetailed into the rim, as at *f*, while their inner ends are mitered and fit against a flange, *g*, of a re-enforce plate, D, which flange *g* is slotted to receive a bolt, *h*, that clamps the ends of the two spokes to it.

The ends of the bars B are doweled into their respective halves of the rim, as at *i*, and the ends of the bars B are formed with shoulders *j*, that are beveled, as are also the ends of each half-rim, to form an angular lip, *m*, which lip, when the pulley is put together, enters a corresponding V-shaped recess, *n*, of a key-piece, F, that is interposed between the adjacent ends of the two halves. Screws G are passed through the shoulders diagonally up through the rim.

Figure 3:
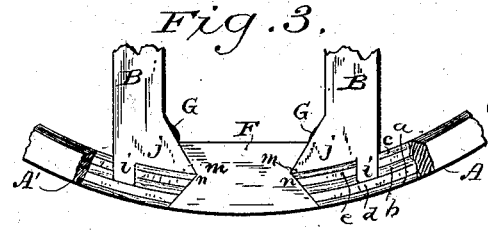

The key-piece F may be made in two parts, as shown in Fig. 1, or in one part, as in Fig. 3. When the key-piece is made in two parts, the opposing faces of its sections are each provided with a recess that fits upon a pin, F', the latter being preferably secured to one of said sections by nails, glue, or other suitable means.

The centers of the bars B comprise the bearing-blocks, and the concavities therein are formed each with three faces that lie at obtuse angles to each other, making, when the two bars are put together, a six-sided opening, to receive the corresponding halves of a hexagonal bearing, H, for the driving-shaft.

In practice, when one of my pulleys is to be placed on a shaft, the two halves are separated from each other (nuts K having been removed from bolts L) by simply drawing the halves apart. They are then clamped on the shaft with the bearing H in place by means of the bolts and nuts L and K, which draw the lips *m* of the rim into the recesses in the key-pieces, and the effect of this will be to clamp all the layers of the rim tightly against each other and to hold the ends of the rim-halves to the shoulders of the bars B.

My object in making the bearing of half-hexagonal sections and the recesses for them in the bearing-blocks to correspond is to insure a tight connection between the driving-shaft and pulley, as the beveled sides of the recesses will have a wedging action upon the beveled sides of the bearing-halves that will compress the halves on all sides and cause them to bite the driving-shaft.

After the bars have been clamped by the bolts L, the nuts on the bolts *h* are tightened, and the arms will then prevent the yielding of the rim between the ends of the bars B.

Having thus fully described my invention, what I claim as new, and desire to secure by Letters Patent, is—

1. The combination, in a split pulley, of cross-bars interposed between the ends of each half of the rim, the two being beveled at their meeting-points, with a key-block having transverse recesses which inclose the parts, and clamping-bolts for locking the two halves together, substantially as described.

2. The combination, in a split pulley, of the cross-bars and rim, and adjustable arms interposed between the bars and rim-sections, substantially as described.

In testimony that I claim the foregoing I have hereunto set my hand, at Milwaukee, in the county of Milwaukee and State of Wisconsin, in the presence of two witnesses.

JULIUS BRUSS.

Witnesses:
WILLIAM KLUG,
N. E. OLIPHANT.